US012709541B2

(12) United States Patent
Ozden et al.

(10) Patent No.: US 12,709,541 B2
(45) Date of Patent: Aug. 18, 2026

(54) HIGH ENTROPY ALLOY CATALYST FOR PRODUCTION OF HYDROGEN FROM NATURAL GAS

(71) Applicant: SAUDI ARABIAN OIL COMPANY, Dhahran (SA)

(72) Inventors: Sehmus Ozden, Katy, TX (US); Feng Liang, Houston, TX (US); Ashok Santra, Tomball, TX (US); Rajesh Saini, Cypress, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 627 days.

(21) Appl. No.: 18/321,445

(22) Filed: May 22, 2023

(65) Prior Publication Data

US 2024/0391764 A1 Nov. 28, 2024

(51) Int. Cl.

*C01B 3/26* (2006.01)
*C01B 3/40* (2006.01)
*C01B 3/48* (2006.01)
*C01B 3/56* (2006.01)

(52) U.S. Cl.

CPC .................. *C01B 3/26* (2013.01); *C01B 3/40* (2013.01); *C01B 3/48* (2013.01); *C01B 3/56* (2013.01); *C01B 2203/0227* (2013.01); *C01B 2203/0277* (2013.01); *C01B 2203/0283* (2013.01); *C01B 2203/042* (2013.01); *C01B 2203/0475* (2013.01); *C01B 2203/1058* (2013.01); *C01B 2203/1241* (2013.01)

(58) Field of Classification Search

None

See application file for complete search history.

(56) References Cited

U.S. PATENT DOCUMENTS 7,449,167 B2 11/2008 Garg et al.
8,241,374 B2 8/2012 Bavarian et al.
9,409,773 B2 8/2016 Achilles et al.
10,629,933 B2 4/2020 Chua et al.

(Continued)

FOREIGN PATENT DOCUMENTS

AU 2006227505 B2 9/2006
CN 113151856 A 7/2021

(Continued)

OTHER PUBLICATIONS

Ramachandran, Ramakrishnan and Raghu K. Menon. "An overview of industrial uses of hydrogen." International Journal of Hydrogen Energy 23 (1998): 593-598.

(Continued)

*Primary Examiner* — Yun Qian

(74) *Attorney, Agent, or Firm* — Vorys, Sater, Seymour and Pease LLP

(57) ABSTRACT

Hydrogen may be produced from natural gas (e.g., methane). For example, a method for producing hydrogen from natural gas may include: introducing natural gas to a reactor, wherein the reactor contains therein a catalyst, wherein the catalyst includes a high entropy alloy, and wherein the high entropy alloy has an entropy, S, such that $S \geq 11.31$ J $K^{-1}$ $mol^{-1}$; reacting the natural gas with the catalyst to form hydrogen gas and solid carbon; and separating the hydrogen gas from the solid carbon to produce a hydrogen stream comprising the hydrogen gas from the reactor.

9 Claims, 3 Drawing Sheets

(56) References Cited

U.S. PATENT DOCUMENTS

| | | | |
|---|---|---|---|
| 2002/0159914 | A1 | 10/2002 | Yeh |
| 2010/0015039 | A1 | 1/2010 | Doshi et al. |
| 2011/0305628 | A1 | 12/2011 | Huang et al. |
| 2013/0302241 | A1 | 11/2013 | Pieterse |
| 2017/0267605 | A1 | 9/2017 | Tanur et al. |
| 2021/0122629 | A1 | 4/2021 | Robertson |

FOREIGN PATENT DOCUMENTS

| | | | |
|---|---|---|---|
| EP | 4013717 | A1 | 6/2022 |
| WO | 2022055225 | A1 | 3/2022 |

OTHER PUBLICATIONS

Muradov, N.. (2001). Hydrogen Via Methane Decomposition: An Application for Decarbonization of Fossil Fuels. International Journal of Hydrogen Energy. 26. 1165-1175.

Parkinson, B. et al. Hydrogen production using methane: Techno-economics of decarbonizing fuels and chemicals. International Journal of Hydrogen Energy 43, 2540-2555, doi:10.1016/j.ijhydene.2017.12.081 (2018).

Rostrup-Nielsen, J.R., Rostrup-Nielsen, T. Large-Scale Hydrogen Production. CATTECH 6, 150-159 (2002).

Rostrup-Nielsen, J.R. & Sehested, Jens & Noerskov, Jens. Hydrogen and Synthesis Gas by Steam and CO2 Reforming. Cheminform. 34. (2003).

Suwimol Wongsakulphasatch, Nichamon Noppakun, Supanida Chimpae, Talita Nimmas, Pattaraporn Kim Lohsoontorn, Jon Powell, Suttichai Assabumrungrat, Chapter 5—Intensified processes of steam reforming and their materials for hydrogen production, Editor(s): Sonil Nanda, Dai-Viet N. Vo, Phuong Nguyen-Tri, New Dimensions in Production and Utilization of Hydrogen, Elsevier, 2020, pp. 117-142.

Boretti, A. and Banik, B.K. , Advances in Hydrogen Production from Natural Gas Reforming. Adv. Energy Sustainability Res. (2021).

Abbas, Hazzim F. and Wan Mohd Wan Daud. "Hydrogen production by methane decomposition: A review." International Journal of Hydrogen Energy 35 (2010): 1160-1190.

Figueiredo, José Luís et al. "Hydrogen production via methane decomposition on Raney-type catalysts." International Journal of Hydrogen Energy 35 (2010): 9795-9800.

Schneider, Stefan, Siegfried Bajohr, Frank Graf and Thomas Kolb. "Process overview for the production of hydrogen by natural gas pyrolysis." Chemical Engineer Technology (2020).

Takenaka, Sakae & Kobayashi, Shoji & Ogihara, Hitoshi & Otsuka, Kiyoshi., Ni/SiO2 catalyst effective for methane decomposition into hydrogen and carbon nanofiber. Journal of Catalysis. 217. 79-87. 00185-9. (2003).

Qian, Jing Xia, Tianjia Chen, Linga Reddy Enakonda, Da Bin Liu, Jean-Marie Basset and Lu Zhou. "Methane decomposition to pure hydrogen and carbon nano materials: State-of-the-art and future perspectives." International Journal of Hydrogen Energy (2020).

Dawood, F., Anda, M. & Shafiullah, G. M. Hydrogen production for energy: An overview. International Journal of Hydrogen Energy 45, 3847-3869, (2020).

Zhang, S., Muratsugu, S., Ishiguro, N. & Tada, M. Ceria-Doped Ni/SBA-16 Catalysts for Dry Reforming of Methane. ACS Catalysis 3, (2013).

Zhang, B., Zhang, S. X., Yao, R., Wu, Y.H. & Qiu, J. S. Progress and prospects of hydrogen production: Opportunities and challenges. Journal of Electronic Science and Technology 19, (2021).

Navarro Yerga, R. M., Álvarez-Galván, M. C., Mota, N., Villoria de la Mano, J. A., Al-Zahrani, S. M., & Fierro, J. L. G. (2010). Catalysts for Hydrogen Production from Heavy Hydrocarbons. ChemCatChem, 3(3), 440-457.

Choi, Y. S., Oh, K., Jung, K.-D., Kim, W.-I., & Koh, H. L. (2020). Regeneration of Pt—Sn/Al2O3 Catalyst for Hydrogen Production through Propane Dehydrogenation Using Hydrochloric Acid. Catalysts, 10(8), 898.

George, E.P., Raabe, D. & Ritchie, R.O. High-entropy alloys. Nat Rev Mater 4, 515-534 (2019).

Xin, Yue & Li, Shuhui & Qian, Yayang & Zhu, Wenkun & Yuan, Haibo & Jiang, Pengyan & Guo, Ruihan & Wang, Liangbing. High-Entropy Alloys as a Platform for Catalysis: Progress, Challenges, and Opportunities. ACS Catalysis. 10. 11280-11306. (2020).

Bondesgaard, M., Broge, N. L. N., Mamakhel, A., Bremholm, M. & Iversen, B. B. General Solvothermal Synthesis Method for Complete Solubility Range Bimetallic and High-Entropy Alloy Nanocatalysts. Advanced Functional Materials 29, (2019).

Yao, Yonggang et al. "Carbothermal shock synthesis of high-entropy-alloy nanoparticles." Science (New York, N.Y.) vol. 359,6383 (2018): 1489-1494.

Zheng, H., Luo, G., Zhang, A., Lu, X. & He, L. The Synthesis and Catalytic Applications of Nanosized High-Entropy Alloys. ChemCatChem 13, 806-817, (2020).

Wang, X., Guo, W. & Fu, Y. High-entropy alloys: emerging materials for advanced functional applications. Journal of Materials Chemistry A 9, 663-701, (2021).

Linfeng Fan, L. Fan, Yaxin Ji, Y. Ji, Genxiang Wang, G. Wang, Junxiang Chen, J. Chen, Kai Chen, K. Chen, Xi Liu, X. Liu, & Zhenhai Wen, Z. Wen. (0000). High Entropy Alloy Electrocatalytic Electrode toward Alkaline Glycerol Valorization Coupling with Acidic Hydrogen Production. Journal of the American Chemical Society, 144, 7224-7235.

Li, Ke & Chen, Wei. (2021). Recent Progress in High-Entropy Alloys for Catalysts: Synthesis, Applications, and Prospects. Materials Today Energy. 20.

HIGH ENTROPY ALLOY CATALYST FOR PRODUCTION OF HYDROGEN FROM NATURAL GAS

FIELD OF THE DISCLOSURE

The present disclosure relates generally to production of hydrogen and, more particularly to production of hydrogen from natural gas.

BACKGROUND OF THE DISCLOSURE

Hydrogen is an emerging clean fuel source with potential to power energy storage, electrical production, vehicle propulsion, and other applications. Hydrogen can be converted to usable energy (including electrical energy) with low or no carbon dioxide emissions using technologies such as fuel cells, as the product of hydrogen used in fuel cells is water, heat, and electricity.

Methane derived from natural gas is the current conventional source for a majority of hydrogen production. Conventional methods of producing hydrogen include steam methane reforming (SMR), autothermal methane reforming (ATR), and partial oxidation of methane (POM). SMR, ATR and POM have a primary disadvantage of high $CO_2$ emissions that negate the clean-burning advantages of using hydrogen as a fuel source. Additional disadvantages of conventional hydrogen production methods include high energy consumption, high cost, low reaction efficiency, low process stability, and low efficiency of catalyst.

Conventional production of hydrogen (including ATR, SMR, POM, and catalysis of methane without oxygen) may involve use of conventional catalyst technology. Catalyst efficiency is one of the key issues with efficient hydrogen production. Conventional catalysts such as monometallic, bimetallic noble, non-noble metal catalysts, and non-metal catalysts may have limited efficiency and limited lifespan due to the compositions of the catalyst, size effects, surface area effects, porosity, defect density, promotor effects, support effects, coordination state of metal in the catalyst, acid-base properties of the catalyst, or any combination thereof.

Another potential method of producing hydrogen is catalysis of natural gas (e.g., methane) without oxygen. However, catalyst efficacy, among other things, hampers large-scale hydrogen production facilities via said method.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

A first nonlimiting method of the present disclosure includes: introducing natural gas to a reactor, wherein the reactor contains therein a catalyst, wherein the catalyst comprises a high entropy alloy, and wherein the high entropy alloy has an entropy, S, such that $S \geq 11.31$ J $K^{-1}$ $mol^{-1}$; reacting the natural gas with the catalyst to form hydrogen gas and solid carbon; and separating the hydrogen gas from the solid carbon to produce a hydrogen stream comprising the hydrogen gas from the reactor.

A second nonlimiting method of the present disclosure includes: introducing natural gas to a reformer reactor, wherein the reformer reactor contains therein a catalyst, wherein the catalyst comprises a high entropy alloy, and wherein the high entropy alloy has an entropy, S, such that $S \geq 11.31$ J $K^{-1}$ $mol^{-1}$; and reacting the natural gas with the catalyst in the reformer reactor to form syngas comprising hydrogen gas and carbon monoxide.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
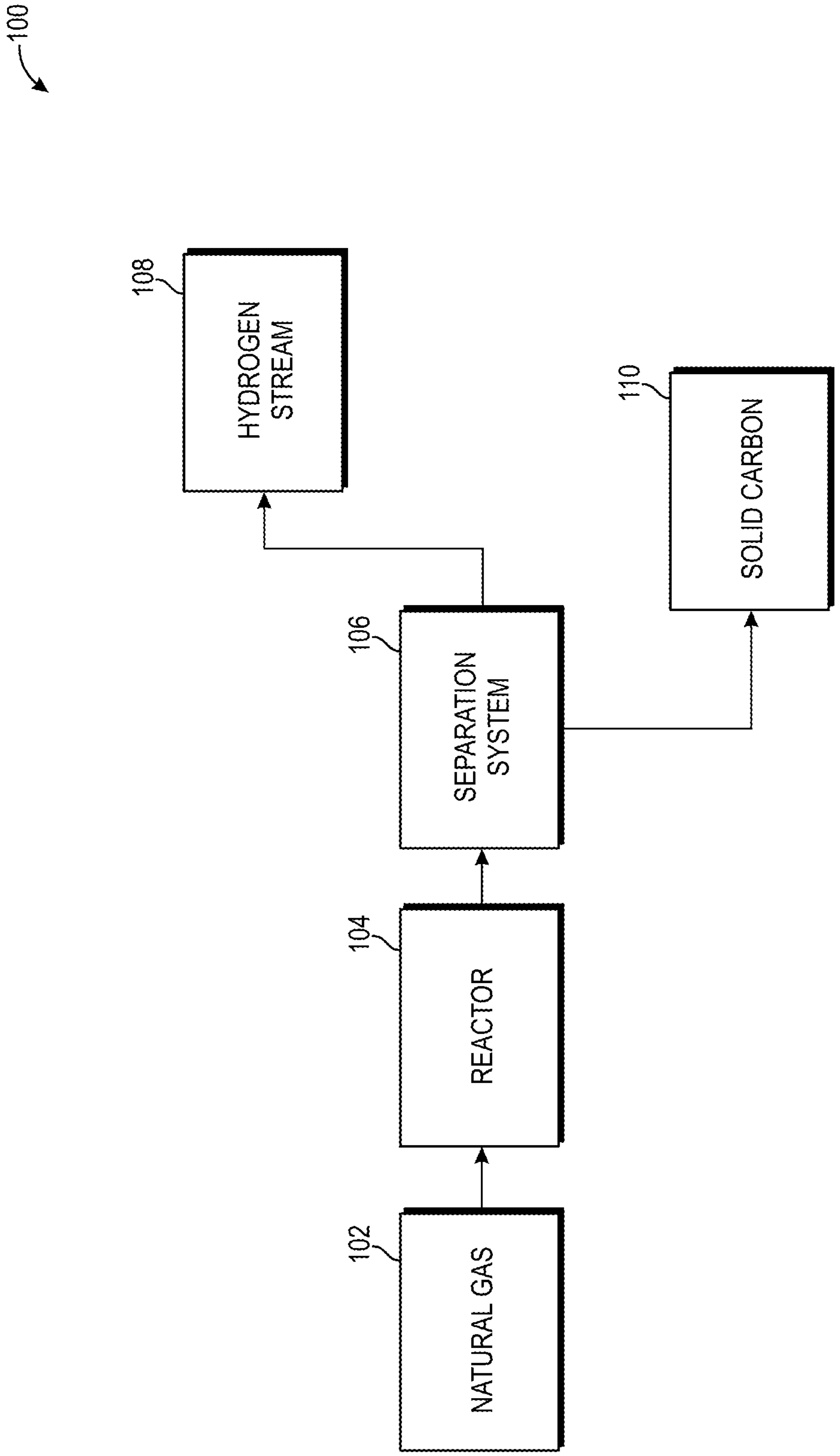
FIG. 1 illustrates a diagram of a nonlimiting system for producing hydrogen according to the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to production of hydrogen and, more particularly, to catalytic production of hydrogen from natural gas (e.g., methane).

The present disclosure provides methods and systems for hydrogen production from natural gas (e.g., methane) utilizing a catalyst that includes a high entropy alloy. The high entropy alloy catalyst system may allow for high catalyst stability and high conversion of natural gas (e.g., methane) to hydrogen gas with high specificity.

"Catalyst," "catalytic," "catalysis," and grammatical variants thereof, as used herein, refers to a chemical compound (or process of using such a chemical compound) that increases the rate of a chemical reaction without being consumed during the reaction. A catalyst may comprise additional components such as, for example, a secondary phase, a catalyst support, a catalyst promotor, the like, or any combination thereof.

"High entropy alloy catalyst" as used herein refers to a catalyst that comprises a high entropy alloy. A high entropy alloy catalyst may comprise additional components as described for a catalyst above.

"High entropy alloy" as used herein, refer to a catalytic composition that has a mixed configuration entropy. S. of $S \geq 11.31$ J $K^{-1}$ $mol^{-1}$ and/or a catalytic composition comprising a metal alloy whose composition consists of five or more metal elements, with each element having a concentration of from 0.1 atomic percent (at %) to 50 at %.

Mixed configuration entropy, S, of a composition (e.g., an alloy) that includes more than one elemental species is typically calculated according to Equation 1 below.

$$S = -R\sum x_i \ln(x_i) \quad \text{Equation 1}$$

where R is the molar gas constant (equal to about 8.314 J $K^{-1}$ $mol^{-1}$), and xi is a mole fraction of an individual elemental species (e.g., an individual metal). Equation 1 may be simplified for alloys with an equimolar ratio of elements to Equation 2 below.

$$S = R \ln n \quad \text{Equation 2}$$

where n is the number of individual elemental species present in the alloy.

An alloy may be considered a high entropy alloy if the entropy, S, is greater than the entropy of mixed configuration of an equimolar compound with 4 species, or preferably 5 species. If the number of equimolar elemental species present is 4 then S=1.36R. In a more preferred case, the number of equimolar elemental species present may be 5, and thus S=1.5R. Thus, if the alloy has an entropy S, such that $S \geq 1.36R$, equaling to $S \geq 11.31$ J $K^{-1}$ $mol^{-1}$, the alloy can be considered a high entropy alloy.

The high entropy alloys that are suitable for use in catalysts for hydrogen production in accordance with the present disclosure may comprise metals including, but not limited to, cobalt, chromium, iron, manganese, nickel, aluminum, magnesium, copper, zinc, zirconium, ruthenium, rhodium, palladium, silver, tungsten, rhenium, iridium, platinum, gold, cerium, ytterbium, tin, calcium, beryllium, the like, or any combination thereof. It should be noted that the high entropy alloy may comprise 4 or more (or 4, or 4 to 30, or preferably 5 or more, or 5, or 5 to 6, or 5 to 7, or 5 to 8, or 5 to 9, or 5 to 10, or 5 to 15, 5 to 20, or 5 to 25, or 5 to 30) suitable metals in any combination. Each metal in the high entropy alloy may comprise from 0.1 at % to 50 at % (or 0.1 at % to 20 at %, or 0.1 at % to 40 at %, or 0.1 at % to 25 at %, or 1 at % to 25 at %, or 5 at % to 35 at %) of the high entropy alloy.

The high entropy alloys may have a metal crystalline structure including, but not limited to, a face centered cubic (FCC), a body centered cubic (BCC), a hexagonal close packed (HCP) structure, the like, or any combination thereof. Furthermore, high entropy alloys of the present disclosure may have an amorphous structure or may have a structure comprising a combination of crystalline metal and amorphous components.

The inclusion of a high entropy alloy in the catalyst may provide additional features to the catalyst including increased activity and decreased adsorption energy. Without being bound by theory, it is believed that the presence of additional elements contributing to the high entropy of the high entropy catalyst allows for additional atomic arrangements on the surface of the catalyst, allowing for increased adsorption to the surface of the catalyst.

The high entropy alloy may be manufactured using synthesis in solid phase, liquid phase, gas phase, or any combination thereof. The synthesis method used may comprise any suitable method of manufacturing a high entropy alloy including, but not limited to, a wet-chemical method, sol-gel auto-combustion, spray pyrolysis, carbothermal shock synthesis, a hydrothermal method, pulse-laser ablation, mechanical milling, arc melting, induction melting, a metal spray technique, molecular beam epitaxy, atomic layer deposition, chemical vapor deposition, pulsed laser deposition, the like, or any combination thereof.

A catalyst support may be included in the catalyst. "Catalyst support" and grammatical variants thereof, as used herein, refers to a compound or material to which the catalyst is affixed for providing additional features. The catalyst support used in the present disclosure may comprise any suitable catalyst support material including, but not limited to, a metal, a metal oxide, a zeolite, carbon black, a secondary phase, the like, or any combination thereof. Suitable metal oxides may include, but are not limited to, $Al_2O_3$, $Al_2O_4$, $SiO_2$, MgO, $TiO_2$, $Fc_2O_4$, FCO, $ZrO_2$, $CeO_2$, a lanthanide oxide (e.g., $Er_2O_3$), the like, or any combination thereof. The catalyst may comprise from 0.0001 at % to 50 at % (or 0.0001 at % to 20 at %, or 0.0001 at % to 40 at %) of the catalyst support. The catalyst support may be an internal catalyst support, an external catalyst support, or any combination thereof. An "internal catalyst support" as used herein refers to the catalyst support being embedded in the high entropy alloy structure. As a nonlimiting example, a catalyst with an internal catalyst support may comprise nanoparticles of silica where more than one nanoparticle of silica is on the surface of and/or within parts of a single catalyst particle, thus the silica nanoparticles comprise an internal catalyst support. An "external catalyst support" as used herein refers to a catalyst support that is external to the structure of the high entropy alloy. As a nonlimiting example, a catalyst with an external catalyst support may comprise an Au/$TiO_2$ catalyst, wherein the Au acts catalytically and the $TiO_2$ forms a large particle external to the Au, the $TiO_2$ thus acting as an external catalyst support.

The catalyst support, when added to the catalyst may serve to increase the efficiency of the catalysis. The catalyst support may provide features to the catalyst such as, for example, increasing alloy dispersion, improving sintering resistance, increasing the rate of reactant adsorption, or any combination thereof. The catalyst support may additionally prevent coke formation on the surface of the catalyst, maintaining increased catalyst activity for a longer time duration. The catalyst support may function by interacting chemically, physically, or chemically and physically, with the other components of the catalyst, a reaction substrate, or any combination thereof.

A catalyst promotor may be included in the catalyst. "Catalyst promotor" and grammatical variants thereof, as used herein, refer to a compound provided with a catalyst for increasing the catalytic activity of the catalyst. The catalyst promotor used in the present disclosure may comprise any suitable catalyst promotor material including, but not limited to, a metal, a metal oxide, a secondary phase, the like, or any combination thereof. Suitable catalyst promotor materials may include, but are not limited to, an alkali metal (e.g., lithium, sodium, potassium, cesium, francium, or any combination thereof), an alkali earth metal (e.g., calcium, magnesium, barium, or any combination thereof), a transition metal (e.g., iron, cobalt, manganese, magnesium, nickel, molybdenum, copper, palladium, platinum, rhenium, or any combination thereof), a post-transition metal (e.g. aluminum, gallium), a cerium compound (e.g., cerium, a cerium oxide (e.g., $Ce_2O_3$, $CeO_2$, or any combination thereof), or any combination thereof), a lanthanide (e.g., lanthanum, neodymium, or any combination thereof), a metal oxide (e.g., MgO, $Ca_2SiO_4$, CaO, or any combination thereof), a germanium compound, the like, or any combination thereof. The catalyst promotor may comprise from 0.0001 at % to 50 at % (or 0.0001 at % to 20 at %, or 0.0001 at % to 40 at %) of the catalyst. The catalyst promotor may be an internal catalyst promotor, an external catalyst promotor, or any combination thereof. An "internal catalyst promotor" as used herein refers to wherein the catalyst promotor is embedded in the high entropy alloy structure. An "external catalyst promotor" as used herein refers to a catalyst promotor that is external to the structure of the high entropy alloy.

The catalyst promotor used in the present disclosure may serve as a chemical promotor, a structural promotor, or any combination thereof. When serving as a chemical promotor, the catalyst promotor may improve the efficiency of the catalyst by, without being bound by theory, altering the distribution of electrons at the surface of the catalyst. When serving as a structural promotor, the catalyst promotor may alter mechanical properties of the catalyst such as, for example, increase sintering resistance. The catalyst promotor may also provide additional features such as increasing selectivity of the catalyst for a particular reactant. Without being bound by theory, the catalyst promotor may increase adsorption and chemisorption for a specific reactant at an active site of the catalyst, thus increasing selectivity. The catalyst promotor may also increase the durability of the catalyst.

It should be noted that in some embodiments the catalyst promotor may be a metal that in other embodiments may be a catalyst support, and yet in other embodiments may comprise the high entropy alloy. In other words, a single metal may provide catalytic activity in some embodiments, may serve as a catalyst promotor in other embodiments, and may serve as a catalyst support in yet other embodiments. Without being bound by theory, the function of a metal may be determined by other components in the catalyst and interactions with the other elements and compounds. By way of an illustrative nonlimiting example, in a first case a catalyst may comprise a high entropy alloy wherein the high entropy alloy comprises nickel, aluminum, magnesium, copper, and zinc, and wherein the catalyst further comprises zirconium as an internal catalyst promotor. Continuing the nonlimiting example, in a second case a catalyst may comprise a high entropy alloy wherein the high entropy alloy comprises nickel, aluminum, rhodium, silver, and palladium, and wherein the catalyst further comprises copper as an internal catalyst promotor. Continuing the nonlimiting example, in a third case a catalyst may comprise a high entropy alloy wherein the high entropy alloy comprises nickel, aluminum, zirconium, palladium, and zinc, and wherein the catalyst further comprises copper as a catalyst support. In the aforementioned nonlimiting example, copper may, depending on the embodiment, comprise the high entropy alloy, may serve as a catalyst promotor, or may serve as a catalyst support.

The catalysts described herein may also further comprise a secondary phase. The secondary phase may interact with any component of the catalyst and may provide features such as increased catalytic activity to the catalyst. As noted above, the secondary phase or portions thereof may serve as a catalyst promotor, a catalyst support, or any combination thereof. The secondary phase may comprise any suitable composition including, but not limited to, an intermetallic phase, a laves phase, a carbide phase, a boride phase, a borocarbide phase, a nitride phase, a silicide phase, an aluminide phase, an oxide phase (e.g. MgO, $Al_2O_3$, or any combination thereof), a phosphide phase, a phosphate phase, a sulfide phase, a sulfate phase, a hydride phase, a hydrate phase, a carbonitride phase, a graphene phase, a graphene oxide phase, a nanotube phase, a graphite phase, or any combination thereof.

The catalyst may be present in the form of a plurality of particles. The plurality of particles may have an average dimension from 1 nanometer (nm) to 999 micrometers (μm) (or 1 nm to 500 μm, or 1 nm to 10 μm, or 1 nm to 999 nm, or 1 μm to 999 μm). The average dimension of the plurality of particles may be defined as the average width, length, height, diameter, or any combination thereof of a particle. The particles may be of any shape including, but not limited to, spherical, cubic, triangular, oblong, irregular, or any combination thereof. The plurality of particles may be formed to a catalyst bead, catalyst pellet, or any combination thereof in any suitable shape and size.

The catalyst may further comprise a non-stick additive. The non-stick additive may prevent sticking of solid carbon to the catalyst, potentially maintaining the activity of the catalyst for an extended period of time, reducing the need to clean or replace the catalyst, thus reducing costs. The non-stick additive may comprise any suitable material including, but not limited to, a magnesium silicate, a borosilicate, a borate, aluminum oxide, silicon dioxide, titanium oxide, zirconium oxide, the like, or any combination thereof.

The present disclosure furthermore includes methods and systems of hydrogen production utilizing the catalysts described above.

A diagram illustrating a nonlimiting system of the present disclosure is illustrated in FIG. 1. The system 100 may comprise wherein the natural gas 102 is introduced to a reactor 104, wherein the reactor 104 contains therein the catalyst. The system 100 may further comprise wherein the natural gas 102 reacts with the catalyst to form hydrogen gas and solid carbon. The system 100 may further comprise a separation system 106 for separating the hydrogen gas from the solid carbon to produce a hydrogen stream 108 comprising the hydrogen gas from the reactor and produce solid carbon 110.

The reactor may be a reactor such as, for example, a natural gas pyrolysis reactor. The reactor may be any suitable configuration of reactor including, but not limited to, a packed bed reactor, a fluidized bed reactor, a membrane reactor, the like, or any combination thereof. The reactor may have one or more catalyst beds contained therein, the one or more catalyst beds comprising the catalyst. The pressure of the reactor may be from 1 bar to 25 bar (or 1 bar to 20 bar, or 1 bar to 10 bar, or 5 bar to 15 bar, or 10 bar to 20 bar, or 15 bar to 25 bar, or 0.1 bar to 25 bar). The temperature of the reactor may be from 300° C. to 1200° C. (or 300° C. to 600° C., or 300° C. to 900° C., or 900° C. to 1200° C., or 100° C. to 1400° C.).

It should be noted that "natural gas" as used within the present disclosure refers to any suitable hydrocarbon gas that may include, but is not limited to, methane, the like, or any combination thereof. The natural gas may enter the reactor at any suitable pressure, temperature, and flowrate compatible with the reaction conditions of the reactor. The natural gas may further comprise an inert carrier gas (e.g., nitrogen gas, argon, the like, or any combination thereof). While in the reactor, the natural gas may be catalyzed by the catalyst to form the hydrogen gas and solid carbon. It should be noted that other impurities may be formed in the reactor in addition to the hydrogen gas and solid carbon and may be intermixed with the hydrogen gas, the solid carbon, or both. The solid carbon may be of any form including, but not limited to, amorphous carbon, carbon nanotubes, nanofibers, graphite, graphene, the like, or any combination thereof.

Separating the hydrogen gas from the solid carbon to produce a hydrogen stream may comprise passing the hydrogen gas through a separation system that may comprise, for example, a separation membrane. The separation membrane may separate the hydrogen gas from the solid carbon, impurities (e.g., unreacted natural gas, the like, or any combination thereof), side products formed during pyrolysis (e.g., ethane, ethene, benzene, hydrogen sulfide, carbon dioxide, the like, or any combination thereof), the like, or any combination thereof. Any suitable separation membrane may be used. The separation system including the separation system may be housed within the reactor or may be external to the reactor.

The system may have a conversion efficiency of from 20% to 99.9% (or 20% to 60%, or 60% to 99.9%, or greater than 99.9%). Conversion efficiency, CE, may be calculated by Equation 3 below.

$$CE = (R_{FEED} - R_{OUTLET})/R_{FEED} * 100 \quad \text{Equation 3}$$

where $R_{FEED}$ is the quantity of reactant in the feed, and $R_{OUTLET}$ is the quantity of reactant in the outlet.

The hydrogen stream may be of any suitable purity including from 90 mol % to 99.99 mol % percent purity (or 60 mol % to 99.99 mol %, or 80 mol % to 99.99 mol %, or 95 mol % to 99.99 mol %). The hydrogen stream may be provided at any suitable temperature and pressure. The pressure and temperature of the hydrogen stream may be affected by the pressure and temperature of the reactor, the separation system, or any combination thereof. The hydrogen stream may subsequently be directed from the separation system to any suitable location including, but not limited to, a pipeline, a storage tank, a railcar tank, the like, or any combination thereof.

Figure 2:
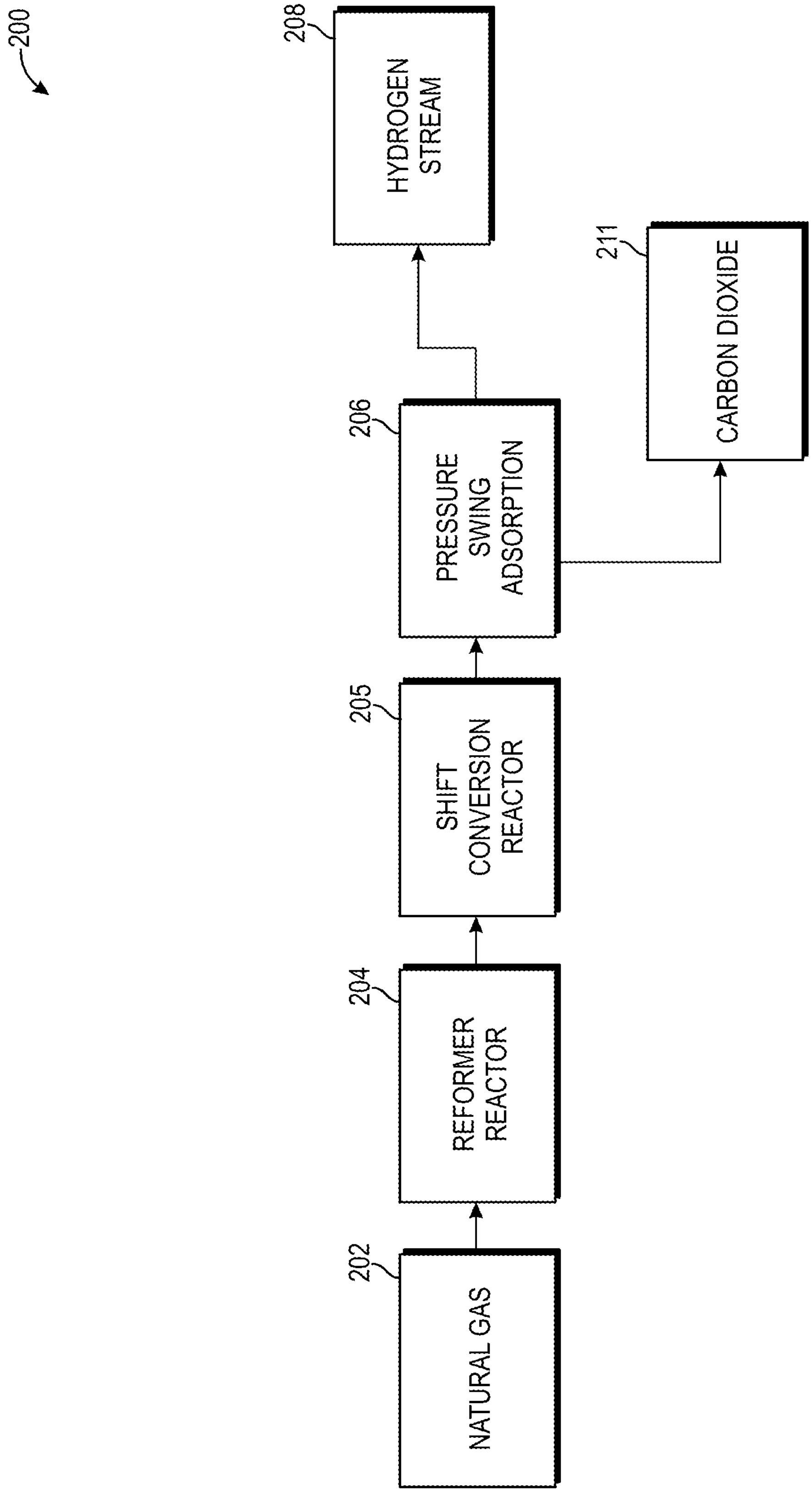
FIG. 2 illustrates a diagram of another nonlimiting system for producing hydrogen according to the present disclosure.

Another nonlimiting system of the present disclosure for producing hydrogen is illustrated in a diagram in FIG. 2. The system 200 may comprise wherein natural gas 202 is introduced to a reformer reactor 204 containing therein a catalyst and the natural gas 202 is reacted with the catalyst in the reformer reactor 204 to form syngas comprising hydrogen gas and carbon monoxide. The system 200 may further comprise wherein the syngas is introduced to a shift conversion reactor 205 containing therein a catalyst, and the syngas is reacted with the catalyst in the shift conversion reactor 205 to convert the carbon monoxide to carbon dioxide. The system 200 may further comprise wherein the hydrogen gas and the carbon dioxide are introduced to a pressure swing adsorption unit 206, and wherein the hydrogen gas and carbon dioxide are separated in the pressure swing adsorption unit 206 to produce a hydrogen stream 208 comprising the hydrogen gas and to produce carbon dioxide 211.

The reformer reactor may be any suitable natural gas reformer reactor such as, for example, a steam methane reforming reactor, an autothermal methane reforming reactor, a partial oxidation of methane reactor, the like, or any combination thereof. The reformer reactor may be any suitable configuration of reactor including, but not limited to, a packed bed reactor, a fluidized bed reactor, a membrane reactor, the like, or any combination thereof. The reformer reactor may have one or more catalyst beds contained therein, the one or more catalyst beds comprising the catalyst. The pressure of the reformer reactor may be from 3 bar to 25 bar (or 1 bar to 20 bar, or 1 bar to 10 bar, or 5 bar to 15 bar, or 10 bar to 20 bar, or 15 bar to 25 bar, or 0.1 bar to 25 bar, or 1 bar to 25 bar). The temperature of the reactor may be from 300° C. to 1000° C. (or 300° C. to 1200° C., or 300° C. to 600° C., or 300° C. to 900° C., or 900° C. to 1200° C., or 100° C. to 1400° C.).

The natural gas may enter the reformer reactor at any suitable pressure, temperature, and flowrate compatible with the reaction conditions of the reformer reactor. The natural gas may comprise a carrier gas (e.g., steam, air, carbon dioxide, oxygen gas, nitrogen gas, argon, the like, or any combination thereof). While in the reformer reactor, the natural gas may be catalyzed by the catalyst to form syngas comprising hydrogen gas and carbon monoxide. The syngas may comprise hydrogen gas and carbon monoxide in any amount, and the syngas may comprise additional species (e.g., carbon dioxide) in any amount.

The shift conversion reactor may comprise a water gas shift reactor or any suitable shift conversion reactor. The syngas may enter the shift conversion reactor at any suitable pressure, temperature, and flowrate compatible with the reaction conditions of the shift conversion reactor. The shift conversion reactor may preferably comprise a water gas shift reactor and may have connected thereto a supply of water for purposes of reaction. The shift conversion reactor may have fluidly connected to it a supply of a carrier gas (e.g., steam, air, carbon dioxide, oxygen gas, nitrogen gas, argon, the like, or any combination thereof). It should be noted that the shift conversion reactor may comprise two reactors or more reactors in series, and the reactors may operate at any suitable temperature and pressure. For example, any of the reactors within the shift conversion reactor may operate at a pressure of from 5 bar to 70 bar (or 10 bar to 60 bar, or 10 bar to 40 bar) and a temperature of from 100° C. to 600° C. (or 100° C. to 500° C., or 150° C. to 300° C., or 150° C. to 250° C., or 190° C. to 150° C., or 250° C. to 500° C., or 300° C. to 500° C., or 300° C. to 450° C.). The shift conversion reactor converts the syngas (and, if present, water) in the presence of a catalyst to hydrogen gas and carbon dioxide. Any suitable catalyst may be used in the shift conversion reactor including a high entropy alloy catalyst described herein, a shift conversion catalyst, or any combination thereof. Examples of suitable shift conversion catalysts may include, but are not limited to, $CuO/CeO_2$, $Fe—Cr/Al_2O_3$, $Cu/ZnO/Al_2O_3$, the like, or any combination thereof. The catalyst used in the shift conversion reactor may be housed within the shift conversion reactor in a reactor bed or similar apparatus.

The pressure swing adsorption unit may comprise any suitable unit including, but not limited to, a pressurized reaction vessel. The pressure swing adsorption unit may use multiple stages for adsorption. The hydrogen gas and carbon dioxide may enter the pressure swing adsorption unit at any suitable pressure, temperature, and flowrate compatible with the pressure swing adsorption unit. The pressure swing adsorption unit may use an adsorptive material. Examples of suitable adsorptive materials may include, but are not limited to, a zeolite (e.g., zeolite 5A, zeolite 13X, the like, or any combination thereof), activated carbon, monoethanolamine (MEA), an MOF (e.g., MOF-5), MgO/C, the like, or any combination thereof. The adsorptive material may be housed in a reaction bed such as, for example, a packed bed, a fluidized bed, the like, or any combination thereof. The pressure swing adsorption unit may vary pressure from an adsorption pressure to a regeneration pressure in order to separate carbon dioxide and hydrogen gas. Suitable adsorption pressures may, for example, be from 1 bar to 10 bar, and suitable regeneration pressures may be from 0.01 bar to 0.1 bar. The pressure swing adsorption unit may produce the hydrogen stream.

The hydrogen stream may be of any suitable purity including from 90 mol % to 99.99 mol % percent purity (or 60 mol % to 99.99 mol %, or 80 mol % to 99.99 mol %, or 95 mol % to 99.99 mol %). The hydrogen stream may be provided at any suitable temperature and pressure. The pressure and temperature of the hydrogen stream may be affected by the pressure and temperature of the reformer reactor, the shift conversion reactor, the pressure swing adsorption unit, or any combination thereof. The hydrogen stream may subsequently be directed from the pressure swing adsorption unit to any suitable location including, but not limited to, a pipeline, a storage tank, a railcar tank, the like, or any combination thereof.

Any of the reactors described in any system above may contain a heating system to heat the reactor. The heating system of the reactor may require extensive thermal duty, and thus use of a heating method with lower carbon dioxide emissions may be preferred, though any suitable heating method may be used. Suitable heating methods for use in the present disclosure may include, but are not limited to, hydrocarbon heating, induction heating, plasma heating (e.g., microwave plasma), microwave heating, solar furnace heating, the like, or any combination thereof.

Hydrocarbon heating may comprise burning a hydrocarbon such as, for example, natural gas, gasoline, or any combination thereof in order to provide thermal energy. It should be noted that any suitable heat conduction material, heat transfer fluid, or any combination thereof, may be used to convey heat energy from the burning of the hydrocarbon to the reactor.

The heating system may comprise induction heating. In an induction heating system an electrical current may flow through metal coils to heat metal within the catalyst through electromagnetic induction. Induction heating may increase efficiency of heating by reducing waste heat loss, thus improving the energy efficiency of the reactor.

Plasma heating may comprise a system wherein heat is provided through heating of gasses within the reactor to produce plasma. Microwave heating may comprise a system wherein metal coils are used to produce microwave radiation, heating species within the reactor. Solar furnace heating may comprise a system that utilizes thermal energy from solar radiation and conveys the solar radiation thermal energy to the reactor in order to heat the reactor.

It should be appreciated that one skilled in the art should be able to, with the benefit of this disclosure, implement the methods and systems described above. It should be noted that additional nonlimiting components may be utilized in the methods and systems described above to produce hydrogen. Such additional components will be familiar to one having ordinary skill in the art and may include, but are not limited to, valves, pumps, joints, sensors, compressors, controllers, heat exchangers, the like, or any combination thereof.

EXAMPLES

Example 1

A high entropy alloy catalyst in powder form comprising FeCoNiCrAl with a molar ratio of elements of 1:1:1:1:1 was used for methane pyrolysis. The FeCoNiCrAl catalyst used was MET5002, available commercially from Matexcel. The catalyst powder had a particle size of from 45 μm to 105 μm.

Figure 3:
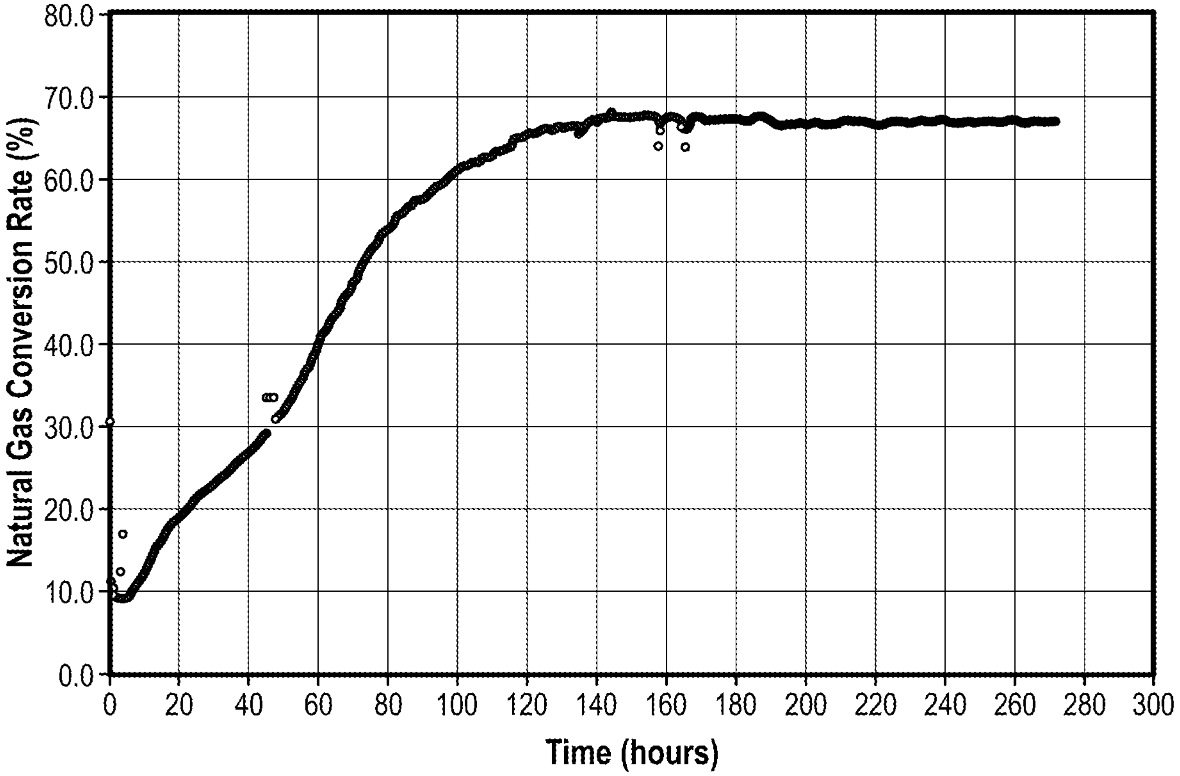
FIG. 3 is a graph showing the methane conversion rate in Example 1.

About 20 g of MET5002 were loaded into a vertical tubular reactor equipped with a quartz tube with 1 inch diameter and 530 mm long (22 mm ID×25 mm OD×530 mm long with #4 porosity Frit 200 mm from bottom). The quartz tube was closed on both ends by closures with suitable gas inlets and gas outlets. The system was purged with methane gas after the reactor reached the reaction temperature of about 700° C. The gas flow of methane was 20 mL/min. The heating rate was 10° C. per minute. The exhaust gas comprising produced hydrogen, unreacted methane, and other possible produced gases were analyzed by online gas-chromatography. The methane conversion rate based on analysis of the exhaust gas is shown in a graph in FIG. 3. As shown in FIG. 3, the methane conversion rate leveled off at about 66% after about 120 hours.

ADDITIONAL EMBODIMENTS

Embodiments disclosed herein include:

Embodiment 1. A method comprising: introducing natural gas to a reactor, wherein the reactor contains therein a catalyst, wherein the catalyst comprises a high entropy alloy, and wherein the high entropy alloy has an entropy, S, such that $S \geq 11.31\ J\ K^{-1}\ mol^{-1}$; reacting the natural gas with the catalyst to form hydrogen gas and solid carbon; and separating the hydrogen gas from the solid carbon to produce a hydrogen stream comprising the hydrogen gas from the reactor.

Embodiment 2. The method of Embodiment 1, wherein the natural gas comprises methane.

Embodiment 3. The method of Embodiment 1 or 2, wherein the high entropy alloy comprises 5 or more metals.

Embodiment 4. The method of Embodiment 3, wherein each of the 5 or more metals has a composition in the high entropy alloy from 0.1 at % (atomic percentage) to 50 at %.

Embodiment 5. The method of Embodiment 3 or 4, wherein the 5 or more metals are selected from a group consisting of: cobalt, chromium, iron, manganese, nickel, aluminum, magnesium, copper, zinc, zirconium, ruthenium, rhodium, palladium, silver, tungsten, rhenium, iridium, platinum, gold, cerium, ytterbium, tin, calcium, beryllium.

Embodiment 6. The method of any one of Embodiments 1-5, wherein the catalyst further comprises a secondary phase.

Embodiment 7. The method of Embodiment 6, wherein the secondary phase comprises an intermetallic phase, a laves phase, a carbide phase, a boride phase, a borocarbide phase, a nitride phase, a silicide phase, an aluminide phase, an oxide phase, a phosphide phase, a phosphate phase, a sulfide phase, a sulfate phase, a hydride phase, a hydrate phase, a carbonitride phase, a graphene phase, a graphene oxide phase, a nanotube phase, a graphite phase, or any combination thereof.

Embodiment 8. The method of any one of Embodiments 1-7, wherein the high entropy alloy comprises a catalyst support.

Embodiment 9. The method of Embodiment 8, wherein the catalyst support comprises a metal oxide.

Embodiment 10. The method of any one of Embodiments 1-9, wherein the high entropy alloy comprises a catalyst promotor.

Embodiment 11. The method of any one of Embodiments 1-10, wherein the catalyst further comprises an external catalyst support.

Embodiment 12. The method of any one of Embodiments 1-11, wherein the catalyst further comprises an external catalyst promotor.

Embodiment 13. The method of any one of Embodiments 1-12, wherein the catalyst is located in a catalyst bed contained within the reactor.

Embodiment 14. The method of any one of Embodiments 1-13, wherein separating the hydrogen gas from the solid carbon comprises using a separation membrane.

Embodiment 15. The method of any one of Embodiments 1-14, wherein the reactor is heated by hydrocarbon heating, induction heating, plasma heating, microwave heating, solar furnace heating, or any combination thereof.

Embodiment 16. The method of any one of Embodiments 1-15, wherein the solid carbon comprises amorphous carbon, carbon nanotubes, nanofibers, or any combination thereof.

Embodiment 17. The method of any one of Embodiments 1-16, wherein a pressure of the reactor is from 1 bar to 25 bar.

Embodiment 18. The method of any one of Embodiments 1-17, wherein a temperature of the reactor is from 300° C. to 1200° C.

Embodiment 19. The method of any one of Embodiments 1-18, wherein the catalyst further comprises a non-stick additive, and wherein the non-stick additive comprises a magnesium silicate, a boron silicate, a borate silicate, aluminum oxide, silicon dioxide, titanium oxide, zirconium oxide, or any combination thereof.

Embodiment 20. A method comprising: introducing natural gas to a reformer reactor, wherein the reformer reactor contains therein a catalyst, wherein the catalyst comprises a high entropy alloy, and wherein the high entropy alloy has an entropy, S, such that $S \geq 11.31\ J\ K^{-1}\ mol^{-1}$; and reacting the natural gas with the catalyst in the reformer reactor to form syngas comprising hydrogen gas and carbon monoxide.

Embodiment 21. The method of Embodiment 20, wherein the natural gas comprises methane.

Embodiment 22. The method of Embodiment 20 or 21, further comprising: introducing the syngas to a shift conversion reactor, wherein the shift conversion reactor contains therein a second catalyst; reacting the syngas and water in the presence of the second catalyst in the shift conversion reactor to convert the carbon monoxide to carbon dioxide; introducing the hydrogen gas and the carbon dioxide to a pressure swing adsorption unit; and separating the hydrogen gas from the carbon dioxide in the pressure swing adsorption unit to produce a hydrogen stream comprising the hydrogen gas.

Embodiment 23. The method of any one of Embodiments 20-22, wherein the high entropy alloy comprises 5 or more metals.

Embodiment 24. The method of Embodiment 23, wherein each of the 5 or more metals has a composition in the high entropy alloy from 0.1 at % (atomic percentage) to 50 at %.

Embodiment 25. The method of Embodiment 23 or 24, wherein the 5 or more metals are selected from a group consisting of: cobalt, chromium, iron, manganese, nickel, aluminum, magnesium, copper, zinc, zirconium, ruthenium, rhodium, palladium, silver, tungsten, rhenium, iridium, platinum, gold, cerium, ytterbium, tin, calcium, beryllium.

Embodiment 26. The method of any one of Embodiments 20-25, wherein the catalyst further comprises a secondary phase.

Embodiment 27. The method of Embodiment 26, wherein the secondary phase comprises an intermetallic phase, a laves phase, a carbide phase, a boride phase, a borocarbide phase, a nitride phase, a silicide phase, an aluminide phase, an oxide phase, a phosphide phase, a phosphate phase, a sulfide phase, a sulfate phase, a hydride phase, a hydrate phase, a carbonitride phase, a graphene phase, a graphene oxide phase, a nanotube phase, a graphite phase, or any combination thereof.

Embodiment 28. The method of any one of Embodiments 20-27, wherein the high entropy alloy comprises a catalyst support.

Embodiment 29. The method of Embodiment 28, wherein the catalyst support comprises a metal oxide.

Embodiment 30. The method of any one of Embodiments 20-29, wherein the high entropy alloy comprises a catalyst promotor.

Embodiment 31. The method of any one of Embodiments 20-30, wherein the catalyst further comprises an external catalyst support.

Embodiment 32. The method of any one of Embodiments 20-31, wherein the catalyst further comprises an external catalyst promotor.

Embodiment 33. The method of any one of Embodiments 20-32, wherein the catalyst is located in a catalyst bed contained within the reformer reactor.

Embodiment 34. The method of any one of Embodiments 20-33, wherein the reformer reactor is heated by hydrocarbon heating, induction heating, plasma heating, microwave heating, solar furnace heating, or any combination thereof.

Embodiment 35. The method of any one of Embodiments 20-34, wherein a pressure of the reformer reactor is from 3 bar to 25 bar.

Embodiment 36. The method of any one of Embodiments 20-35, wherein a temperature of the reformer reactor is from 300° C. to 1000° C.

Embodiment 37. The method of any one of Embodiments 20-36, wherein the catalyst further comprises an non-stick additive, and wherein the non-stick additive comprises a magnesium silicate, a boron silicate, a borate silicate, aluminum oxide, silicon dioxide, titanium oxide, zirconium oxide, or any combination thereof.

Embodiment 38. A system comprising: a reactor, wherein the reactor contains therein a catalyst, wherein the catalyst comprises a high entropy alloy, and wherein the high entropy alloy has an entropy, S, such that $S \geq 11.31\ J\ K^{-1}\ mol^{-1}$, and wherein the reactor reacts natural gas with the catalyst to form hydrogen gas and solid carbon; and a separation system, wherein the separation system separates the hydrogen gas from the solid carbon to produce a hydrogen stream comprising the hydrogen gas.

Embodiment 39. The method of Embodiment 38, wherein the natural gas comprises methane.

Embodiment 40. The system of Embodiment 38 or 39, wherein the high entropy alloy comprises 5 or more metals.

Embodiment 41. The system of Embodiment 40, wherein each of the 5 or more metals has a composition in the high entropy alloy from 0.1 at % (atomic percentage) to 50 at %.

Embodiment 42. The system of Embodiment 40 or 41, wherein the 5 or more metals are selected from a group consisting of: cobalt, chromium, iron, manganese, nickel, aluminum, magnesium, copper, zinc, zirconium, ruthenium, rhodium, palladium, silver, tungsten, rhenium, iridium, platinum, gold, cerium, ytterbium, tin, calcium, beryllium.

Embodiment 43. The system of any one of Embodiments 38-42, wherein the catalyst further comprises a secondary phase.

Embodiment 44. The system of Embodiment 43, wherein the secondary phase comprises an intermetallic phase, a laves phase, a carbide phase, a boride phase, a borocarbide phase, a nitride phase, a silicide phase, an aluminide phase, an oxide phase, a phosphide phase, a phosphate phase, a sulfide phase, a sulfate phase, a hydride phase, a hydrate phase, a carbonitride phase, a graphene phase, a graphene oxide phase, a nanotube phase, a graphite phase, or any combination thereof.

Embodiment 45. The system of any one of Embodiments 38-44, wherein the high entropy alloy comprises a catalyst support.

Embodiment 46. The system of Embodiment 45, wherein the catalyst support comprises a metal oxide.

Embodiment 47. The system of any one of Embodiments 38-46, wherein the high entropy alloy comprises a catalyst promotor.

Embodiment 48. The system of any one of Embodiments 38-47, wherein the catalyst further comprises an external catalyst support.

Embodiment 49. The system of any one of Embodiments 38-48, wherein the catalyst further comprises an external catalyst promotor.

Embodiment 50. The system of any one of Embodiments 38-49, wherein the catalyst is located in a catalyst bed contained within the reactor.

Embodiment 51. The system of any one of Embodiments 38-50, wherein the separation system comprises a separation membrane.

Embodiment 52. The system of any one of Embodiments 38-51, wherein the reactor is heated by hydrocarbon heating, induction heating, plasma heating, microwave heating, solar furnace heating, or any combination thereof.

Embodiment 53. The system of any one of Embodiments 38-52, wherein the solid carbon comprises amorphous carbon, carbon nanotubes, nanofibers, or any combination thereof.

Embodiment 54. The system of any one of Embodiments 38-53, wherein a pressure of the reactor is from 1 bar to 25 bar.

Embodiment 55. The system of any one of Embodiments 38-54, wherein a temperature of the reactor is from 300° C. to 1200° C.

Embodiment 56. The system of any one of Embodiments 38-55, wherein the catalyst further comprises an non-stick additive, and wherein the non-stick additive comprises a magnesium silicate, a boron silicate, a borate silicate, aluminum oxide, silicon dioxide, titanium oxide, zirconium oxide, or any combination thereof.

Embodiment 57. A system comprising: a reformer reactor, wherein the reactor contains therein a catalyst, wherein the catalyst comprises a high entropy alloy, and wherein the high entropy alloy has an entropy, S, such that $S \geq 11.31\ J\ K^{-1}\ mol^{-1}$, and wherein the reformer reactor reacts natural gas with the catalyst to form syngas comprising hydrogen gas and carbon monoxide.

Embodiment 58. The method of Embodiment 57, wherein the natural gas comprises methane.

Embodiment 59. The system of Embodiment 57 or 58, further comprising: a shift conversion reactor, wherein the shift conversion reactor contains therein a second catalyst, and wherein the shift conversion reactor reacts the syngas with water in the presence of the second catalyst to convert the carbon monoxide to carbon dioxide; and a pressure swing adsorption unit, wherein the pressure swing adsorption unit separates the hydrogen gas from the carbon dioxide to produce a hydrogen stream comprising the hydrogen gas.

Embodiment 60. The system of any one of Embodiments 57-59, wherein the high entropy alloy comprises 5 or more metals.

Embodiment 61. The system of Embodiment 60, wherein each of the 5 or more metals has a composition in the high entropy alloy from 1 at % (atomic percentage) to 50 at %.

Embodiment 62. The system of Embodiment 60 or 61, wherein the 5 or more metals are selected from a group consisting of: cobalt, chromium, iron, manganese, nickel, aluminum, magnesium, copper, zinc, zirconium, ruthenium, rhodium, palladium, silver, tungsten, rhenium, iridium, platinum, gold, cerium, ytterbium, tin, calcium, beryllium.

Embodiment 63. The system of any one of Embodiments 57-62, wherein the catalyst further comprises a secondary phase.

Embodiment 64. The system of Embodiment 63, wherein the secondary phase comprises an intermetallic phase, a laves phase, a carbide phase, a boride phase, a borocarbide phase, a nitride phase, a silicide phase, an aluminide phase, an oxide phase, a phosphide phase, a phosphate phase, a sulfide phase, a sulfate phase, a hydride phase, a hydrate phase, a carbonitride phase, a graphene phase, a graphene oxide phase, a nanotube phase, a graphite phase, or any combination thereof.

Embodiment 65. The system of any one of Embodiments 57-64, wherein the high entropy alloy comprises a catalyst support.

Embodiment 66. The system of Embodiment 65, wherein the catalyst support comprises a metal oxide.

Embodiment 67. The system of any one of Embodiments 57-66, wherein the high entropy alloy comprises a catalyst promotor.

Embodiment 68. The system of any one of Embodiments 57-67, wherein the catalyst further comprises an external catalyst support.

Embodiment 69. The system of any one of Embodiments 57-68, wherein the catalyst further comprises an external catalyst promotor.

Embodiment 70. The system of any one of Embodiments 57-69, wherein the catalyst is located in a catalyst bed contained within the reformer reactor.

Embodiment 71. The system of any one of Embodiments 57-70, wherein the reformer reactor is heated by hydrocarbon heating, induction heating, plasma heating, microwave heating, solar furnace heating, or any combination thereof.

Embodiment 72. The system of any one of Embodiments 57-71, wherein a pressure of the reformer reactor is from 3 bar to 25 bar.

Embodiment 73. The system of any one of Embodiments 57-72, wherein a temperature of the reformer reactor is from 300° C. to 1000° C.

Embodiment 74. The system of any one of Embodiments 57-73, wherein the catalyst further comprises an non-stick additive, and wherein the non-stick additive comprises a magnesium silicate, a boron silicate, a borate silicate, or any combination thereof.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains." "containing," "includes." "including," "comprises," and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A method comprising:

introducing natural gas to a reactor, wherein the reactor contains therein a catalyst, wherein the catalyst comprises a high entropy alloy, and wherein the high entropy alloy has an entropy, S, such that $S \geq 11.31\ J\ K^{-1}\ mol^{-1}$;

reacting the natural gas with the catalyst to form hydrogen gas and solid carbon; and separating the hydrogen gas from the solid carbon to produce a hydrogen stream comprising the hydrogen gas from the reactor.

2. The method of claim 1, wherein the high entropy alloy comprises 5 or more metals, and wherein each of the 5 or more metals has a composition in the high entropy alloy from 0.1 at % (atomic percentage) to 50 at %.

3. The method of claim 2, wherein the 5 or more metals are selected from a group consisting of: cobalt, chromium, iron, manganese, nickel, aluminum, magnesium, copper, zinc, zirconium, ruthenium, rhodium, palladium, silver, tungsten, rhenium, iridium, platinum, gold, cerium, ytterbium, tin, calcium, beryllium.

4. The method of claim 1, wherein the high entropy alloy comprises a catalyst support.

5. The method of claim 1, wherein the high entropy alloy comprises a catalyst promotor.

6. The method of claim 1, wherein the catalyst further comprises an external catalyst support.

7. The method of claim 1, wherein the catalyst further comprises an external catalyst promotor.

8. The method of claim 1, wherein the solid carbon comprises amorphous carbon, carbon nanotubes, nanofibers, or any combination thereof.

9. The method of claim 1, wherein the catalyst further comprises a non-stick additive, and wherein the non-stick additive comprises a magnesium silicate, a boron silicate, a borate silicate, aluminum oxide, silicon dioxide, titanium oxide, zirconium oxide, or any combination thereof.

* * * * *